(12) United States Patent
Maddah-Ali et al.

(10) Patent No.: US 9,401,951 B2
(45) Date of Patent: Jul. 26, 2016

(54) SYSTEM AND METHOD FOR MANAGING DISTRIBUTION OF NETWORK INFORMATION

(71) Applicant: Alcatel-Lucent USA Inc., Murray Hill, NJ (US)

(72) Inventors: Mohammadali Maddah-Ali, Piscataway, NJ (US); Urs Niesen, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 389 days.

(21) Appl. No.: 13/746,406

(22) Filed: Jan. 22, 2013

(65) Prior Publication Data

US 2014/0207913 A1 Jul. 24, 2014

(51) Int. Cl.
*H04L 29/08* (2006.01)

(52) U.S. Cl.
CPC ............. *H04L 67/06* (2013.01); *H04L 67/10* (2013.01); *H04L 67/108* (2013.01); *H04L 67/1076* (2013.01); *H04L 69/329* (2013.01)

(58) Field of Classification Search
CPC ............. H04L 29/06027; H04L 65/4084; H04L 65/607; H04L 67/06; H04L 67/10
See application file for complete search history.

(56) References Cited

U.S. PATENT DOCUMENTS

| | | | | |
|---|---|---|---|---|
| 7,146,406 B2 * | 12/2006 | Ozawa | .................. | H04L 69/329 709/202 |
| 8,150,914 B1 * | 4/2012 | Taneja | .................... | H04L 67/06 709/203 |
| 2003/0165321 A1 * | 9/2003 | Blair | ...................... | H04N 5/783 386/344 |
| 2004/0165610 A1 * | 8/2004 | Chasin | ................... | H04L 67/10 370/428 |
| 2009/0025046 A1 * | 1/2009 | Ganesan | .......... | G06F 17/30017 725/91 |

* cited by examiner

*Primary Examiner* — Barbara Burgess
(74) *Attorney, Agent, or Firm* — Harness, Dickey & Pierce, P.L.C.

(57) ABSTRACT

A method for distributing information in a network includes independently selecting and sending segments of N files to a plurality of terminals through a network. One or more of the selected segments except a first segment are sent to a first number of the K terminals, and one or more of the selected segments except a second segment are sent to a second number of the K terminals. A first logical combination of segments is then generated and sent to the terminals. By logically combining the first logical combination with previously sent files, a new file not previously received may be recovered.

20 Claims, 9 Drawing Sheets

SYSTEM AND METHOD FOR MANAGING DISTRIBUTION OF NETWORK INFORMATION

CROSS-REFERENCE TO RELATED APPLICATIONS

The present application is a continuation-in-part of International Application No. PCT/US2012/030090, filed on Mar. 22, 2012, which claims priority under 35 USC §365 to U.S. patent application Ser. No. 13/077,420, filed on Mar. 31, 2011, the contents of both documents incorporated by reference herein in their entirety.

BACKGROUND OF THE INVENTION

One or more embodiments relate to managing network information.

Communication networks continue to evolve to meet consumer demand for faster and more efficient dissemination of information including multimedia data. While several solutions have been proposed for increasing the throughput and efficiency (e.g., cost/bit delivered) of data dissemination on various communication networks, improvements are still desired.

SUMMARY OF THE INVENTION

In accordance with one embodiment, a method for distributing information in a network comprises sending a first segment of a first file and a second segment of a second file to a first terminal, sending a second segment of the first file and a first segment of the second file to a second terminal, generating a first logical combination of the second segment of the first file and the second segment of the second file, and sending the first logical combination to the first terminal and the second terminal. A logical combination of the first logical combination and the second segment of the second file corresponds to the second segment of the first file, and a logical combination of the first logical combination and the second segment of the first file corresponds to the second segment of the second file. The operation of sending the first logical combination may be performed after receiving a request from the first terminal for the first file and a request from the second terminal for the second file.

The operation of sending the first logical combination may include sending a same packet containing the first logical combination to the first terminal and the second terminal.

The first logical combination may be sent through a same network link coupled to the first and second terminals. The same network link may include a shared path coupled to a branch point where the first logical combination is sent to the first and second terminals through respective first and second paths, and a transfer rate of the first logical combination through the shared path and transfer rates of the first logical combination through the first and second paths may be substantially equal.

The operation of selecting the first segment of the first file may involve selecting the first segment from a plurality of segments of the first file, and the operation of selecting the second segment of the second file may involve selecting the second segment from a plurality of segments of the second file. The first segment of the first file may be selected independently from selection of the second segment of the second file.

The first segment of the first file and the second segment of the second file may be randomly selected. Additionally, or alternatively, the first segment of the first file and the second segment of the second file may be selected independently from the number of users sharing a network link through which the first segment of the first file and second segment of the second file are to be sent.

The method may further include receiving a request from the second terminal during a time when the first segment of the first file and the second segment of the second file is being sent to the first terminal, and sending the second segment of the first file and the first segment of the second file to the second terminal in response to the request for a delay time, wherein the delay time is less than a time to send one of the first segment of the first file or the second segment of the second file. The second segment of the first file and the first segment of the second file may be sent to the second terminal during the time when the first segment of the first file and the second segment of the second file may be sent to the first terminal.

In accordance with another embodiment, a method for managing network information comprises receiving a first segment of a first file and a second segment of a second file during a first time period, sending a request for the first file during a second time period, receiving a first logical combination of a second segment of the first file and a second segment of the second file during the second time period, and logically combining the first logical combination and the second segment of the second file to separate the second segment of the first file from the first logical combination. The first time period may correspond to a first estimated network load and the second time period may correspond to a second estimated network load greater than the first estimated network load.

Each of the first segment of the first file and the second segment of the second file may have one or more bits, and the first logical combination may have a same number of bits as the bits in the first segment of the first file and the second segment of the second file. The first and second files may correspond to different multimedia files.

In accordance with another embodiment, an apparatus for distributing information comprises an interface coupled to a network and a controller configured to send a first segment of a first file and a second segment of a second file to a first terminal and a second segment of the first file and a first segment of the second file to a second terminal through the interface. The controller is further configured to generate a first logical combination of the second segment of the first file and the second segment of the second file and to send the first logical combination to the first terminal and the second terminal through the interface.

The controller may be configured to send the first logical combination to the first and second terminals after at least one of a request is received from the first terminal for the first file or a request is received from the second terminal for the second file.

The storage area may be configured to store information indicating that the first segment of the first file and the second segment of the second file was sent to the first terminal and information indicating that the second segment of the first file and the first segment of the second file was sent to the second terminal. The controller may be configured to generate the first logical combination based on the information stored in the storage area.

A logical combination of the first logical combination and the second segment of the second file may correspond to the second segment of the first file, and a logical combination of the first logical combination and the second segment of the first file may correspond to the second segment of the second file.

The controller may be configured to send a same packet containing the first logical combination to the first terminal and the second terminal through the interface.

The selector may be configured to select a first segment of a first file and a second segment of a second file and to select a second segment of the first file and a first segment of the second file. The first segment of the first file and the second segment of the second file may be selected independently from the second segment of the first file and the first segment of the second file. The interface may be a network interface or controller interface.

In accordance with another embodiment, a method for distributing information in a network includes independently selecting segments of N files with N≥2, sending the selected segments to K terminals with K≥2; generating a first logical combination of segments of M files of the N files with M≤N; and sending the first logical combination to Q terminals of the K terminals, with Q≤K.

The sending operation includes sending including sending one or more of the selected segments except a first segment to a first number of the K terminals and sending one or more of the selected segments except a second segment to a second number of the K terminals.

The one or more selected segments may be sent to the first number of K terminals including the second segment and the one or more selected segments may be sent to the second number of K terminals including the first segment. A logical combination of the first logical combination and the one or more selected segments sent to the first terminal correspond to the first segment and a logical combination of the first logical combination and the one or more selected segments sent to the second terminal correspond to the second segment.

The first and second segments may correspond to different files of the N files, or the first and second segments may correspond to a same file of the N files. Also, the first number of the K terminals may be one or more and the second number of the K terminals may be one or more. Also, the first number of the K terminals may equal the second number of the K terminals.

The method further includes combining a first number of bits from a first one of the N files with a second number of bits from a second one of the N files; and forming one of the first segment or the second segment based on a combination of the first and second numbers of bits. The first number of bits is different from the second number of bits. The method may further include generating the first and second segments in different servers, and the N files may be sub-files of same content.

In accordance with another embodiment, an apparatus for distributing information includes a selector configured to independently select segments of N files and a controller configured to send the selected segments to K terminals, where, N≥2 and K≥2. The controller may send one or more of the selected segments except a first segment to a first number of the K terminals and may send one or more of the selected segments except a second segment to a second number of the K terminals.

In addition, the controller may generate a first logical combination of segments of M files of the N files with M≤N, and may send the first logical combination to Q terminals of the K terminals, with Q≤K. The one or more selected segments sent to the first number of K terminals may include the second segment and the one or more selected segments sent to the second number of K terminals may include the first segment.

A logical combination of the first logical combination and the one or more selected segments sent to the first terminal may correspond to the first segment and a logical combination of the first logical combination and the one or more selected segments sent to the second terminal may correspond to the second segment.

The one or more selected segments may be sent to the first number of K terminals including the second segment and the one or more selected segments may be sent to the second number of K terminals including the first segment. A logical combination of the first logical combination and the one or more selected segments sent to the first terminal correspond to the first segment and a logical combination of the first logical combination and the one or more selected segments sent to the second terminal correspond to the second segment.

The first and second segments may correspond to different files of the N files, or the first and second segments may correspond to a same file of the N files. Also, the first number of the K terminals may be one or more and the second number of the K terminals may be one or more. Also, the first number of the K terminals may equal the second number of the K terminals.

The controller may combine a first number of bits from a first one of the N files with a second number of bits from a second one of the N files; and forming one of the first segment or the second segment based on a combination of the first and second numbers of bits. The first number of bits is different from the second number of bits. The controller may further generate the first and second segments in different servers, and the N files may be sub-files of same content. The N files may correspond, for example, to different movies or different sub-files of a same movie.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

DETAILED DESCRIPTION OF THE EMBODIMENTS

Figure 1:
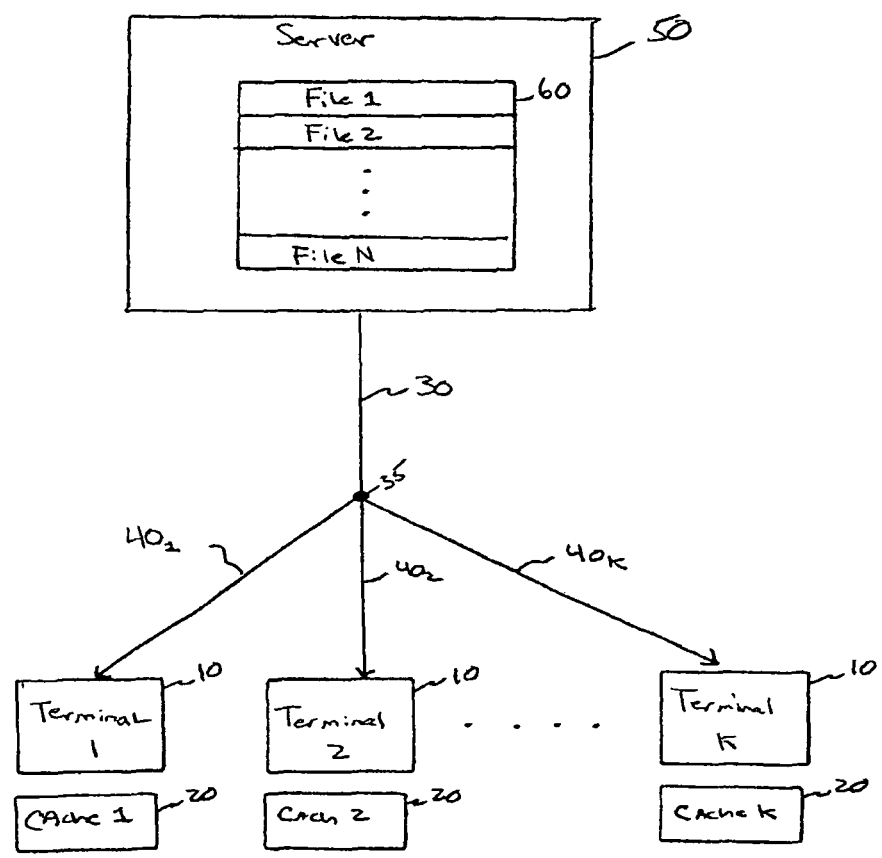
FIG. 1 shows a content distribution system for a network.

Various example embodiments will now be described with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Also, software-implemented aspects of example embodiments may be encoded on some form of tangible (or recording) storage medium or implemented over some type of transmission medium. As used herein, "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code or code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "terminal" may be synonymous to a mobile user, mobile station, mobile terminal, user, subscriber, wireless terminal, user equipment and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

FIG. 1 shows a content distribution system which includes a plurality of terminals 10, each of which contains or is coupled to a storage area 20. The terminals may be personal or notebook computers, pad- or pod-type devices, netbooks, work stations, smart phones, a smart TV, tablets, music terminal, peer-to-peer device, or any other type or combination of information terminals. In one embodiment, the terminals may be subscriber terminals such as set-top boxes in a cable or satellite television network and/or terminals that are included as part of a video-on-demand or pay-per-view system either connected to the Internet and/or to a television system.

The storage area 20 may be a cache, a memory, database, archive, or another type of device for storing content or other information. The content may include a plurality of files including, for example, movies, images, documents, applications, video, text or email messages, graphical content, games, and/or other information that can be streamed, downloaded, transmitted, or otherwise transferred to the terminals. The files may also include updates and/or new versions of software that are used to control or otherwise perform one or more functions of the terminals. These files may be transferred at the request of a terminal user or may be sent automatically or periodically based on, for example, a system schedule.

The terminals 10 are coupled to a server 50 through a network link 30 that is at least partially shared by the terminals. The network may be any one of a variety of networks including but not limited to a local, mid-range or wide area networks or a combination of these networks coupled to one another. Additionally, the network may be a wireless network such as a mobile communication network, satellite network, fiber-optic or cable network, or a short range network such as but not limited to ones that include one or more Bluetooth or WiFi links. One example (discussed in greater below) covers network for transferring movies to set-top boxes or internet terminals that may correspond to, for example, AppleTV, GoogleTV, or a Smart TV coupled to the internet, satellite, or cable television network.

The network link may support duplex communications and may be directly coupled to the terminals or may include one or more branch points 35. As illustratively shown in FIG. 1, branch point 35 may be coupled to respective ones of the terminals through separate network paths 401, 402, . . . 40K. Accordingly, the branch point may include a router, server, or switching device for sending content to the terminals over the so-called "last mile" or other more localized links.

The server includes a storage device 60 for storing any of the aforementioned types of content. For illustrative purposes, the content is described as a plurality of files, i.e., File 1, File 2, . . . File N. The storage device may be included within or coupled to the server. In one embodiment, the storage device may be a type of network attached storage. In another embodiment, the storage device may be a part of a storage area network (SAN) coupled to the server. When the server is coupled to an information distribution system that stores large amounts of content (e.g., a movie library, music or video portal, searchable images or documents, or other types of data), the storage device 60 may be a type of archival database.

Figure 2:
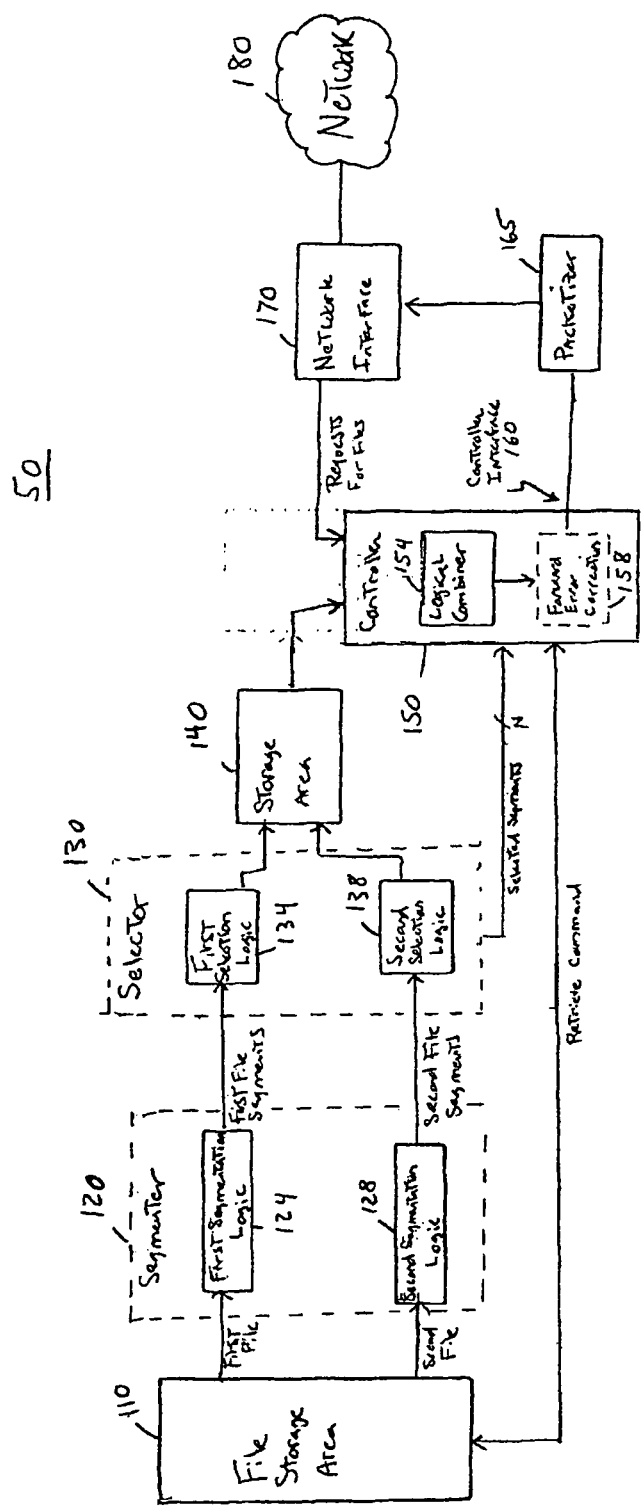
FIG. 2 shows an embodiment of server in FIG. 1.

FIG. 2 shows an embodiment of server 50 in FIG. 1. In this embodiment, the server includes at least one processor and at least one storage device. The at least one processor includes a segmenter 120, a selector 130, and a controller 150. In other embodiments, one or more of segmenter 120, selector 130, and controller 150 may be included in different processors. The at least one storage device may include a file storage area 110 and a storage area 140. In other embodiments, these areas may be included in different storage devices. Also, either or both of the file storage areas may correspond to storage device 60 in FIG. 1 storing Files 1 to N.

The segmenter 120 divides files retrieved from the file storage area into a plurality of segments. The files may be retrieved, for example, according to operating system software and/or based on request(s) for content received from one or more of the terminals. In a video-on-demand, pay-per-view, or television system, for example, requests for the same or different movies may be received from the subscriber terminals. Additionally, or alternatively, the files may be retrieved based on control software of the server to effect, for example, automatic or periodic transfer of files unrequested by a user. This may occur, for example, transparently from a terminal user for a software update.

The file(s) retrieved from the file storage area are divided into a number of segments based on operating system software (as implemented, for example, by controller 150). The number of segments may be predetermined based on the operating system software or may be determined according to another criteria, e.g., based on network load conditions and/or the type of terminal to receive the content (e.g., mobile terminal, smart television, computer, etc.).

The sizes of the divided segments may be the same with padding zeros or other dummy bits inserted where necessary. Alternatively, the sizes of the segments may be different depending, for example, on the segmenting criteria implemented by segmentation logic. The segmentation of a file may be performed on a bit-by-bit, byte-by-byte, or data unit-by-data unit basis; that is, each segment may contain only one bit or one byte of data or may contain a data unit that corresponds to one or more bits or bytes or data words. The segmentation may be performed continuously as data from the file is received from the file storage unit or may be performed after the entire file is received from the file storage area.

In accordance with one embodiment, the segmenter may include or one or a plurality of segmentation logic units. The number of segmentation logic units may correspond, for example, to the number of requests the server is currently handling up to, for example, an upper limit. If two or more terminals have requested the same file, then one segmentation logic may be used to segment the same file for output to the terminals. For illustrative purposes, two segmentation logic units 124 and 128 are shown. The segmentation logic may be implemented in software, hardware, or both.

The selector 130 selects the segments from the segmenter to be transferred to one or more requesting terminals. The segments may be selected sequentially as output from the segmenter or may be selected non-sequentially according to a selecting algorithm implemented by the operating system software. Examples of a non-sequential selection include a random or pseudo-random selection or a selection of segments based on a predetermined or other pattern.

Irrespective of the selecting algorithm, the selector selects all the segments for transfer to the requesting terminal(s), but the order of the selection may be the same or different from segmenter to segmenter. Or, if two terminals are requesting the same file, the selector may select a different order of segments to be sent to the same file. The different selection order may be performed in order to allow improved bit rate performance for during data transfer through a common or shared link 30, in a manner to be described in greater detail below.

For illustrative purposes, the selector 130 is shown in to include two selection logic units 134 and 138 are shown. However, in other embodiments a different number of selection logic units may be included in the selector. Also, the number of selection logic units may be the same or different from the number of segmentation logic units in segmenter 120. In one embodiment, the number of segmentation and selection logic units may be based on a maximum system capacity for handling download or streaming content requests.

The storage area 140 stores information identifying the segments selected by the selector for each terminal. The identification of these segments for each terminal allows for a record to be established as to which segments have already been transferred to a terminal and which segments have not yet been transferred. This record allows for logical combinations of segments to be formed for sending remaining portions of files that have not yet been transferred, as will be discussed in greater detail. The logical combinations may involve different segments of the same file or segments from different files. The selection of these different segments may be performed independently from one another and/or the segments selected by any one selection logic may be different ones or in a different order from the segments selected by another selection logic unit in the selector.

In another implementation, the selection logic units may select at least some of the segments independently from a number of users sharing a network link through which the first segment of the first file and the second segment of the second file are to be sent. This may take place, for example, when portions of files are transferred to terminals at one time period and remaining portions of files are to be transferred at another time period.

The different time periods may correspond to estimated time periods having different network load conditions. For example, different network load conditions (e.g., numbers of active users on the network) may exist for early morning hours when more people are asleep than for evening hours. These different time periods may also correspond to placement and delivery phases programmed into the operating system of the server.

The controller 150 may generate signals for controlling operation of the server, including output of files from the file storage area 110, the functions performed by the segmenter 120 and selector 130, and the storage of information in storage area 140. In accordance with one embodiment, the controller may control the transfer of an initial number of segments of a file to a terminal and then transfer remaining segments of the file at a later time. Transfer of the initial number of segments (e.g., during the placement phase) may take place sequentially or based on a certain pattern as previously described, and transfer of the remaining segments (e.g., during the delivery phase) may take place using the same or a different pattern.

The controller also performs logical combination operations (e.g., illustratively shown by logical combiner 154) based on operating system software. In accordance with one embodiment, the logical combiner forms logical combinations of segments from the same or different files based on the information in storage area 140. The logical combinations may be performed on a bit-by-bit basis for the segments to be logically combined. The logical combination may correspond to or be based on XOR logic or another combination of binary or any other finite field logic.

The segments initially transferred to the terminals may pass through the logical combiner or these segments may be transferred without logical combination. Irrespective of how these initial segments are transferred, the record established in storage area 140 notifies the logical combiner of segments that have already been transferred to one or more terminals. Based on this record, the logical combiner logically combines one or more segments of a file that have not been transferred to a terminal with one or more other segments.

The one or more other segments may be segments from the same file which have already been transferred to the terminal or one or more other terminals, and/or may be segments of one or more different files that have already been transferred to the terminal or one or more other terminals. Examples of how logical combiner operates are discussed in greater detail below.

Once these logical combinations have been formed, they are sent to one or more corresponding terminals through controller interface 160, network interface 170, and network 180. In performing this operation, the logical combinations segments may be sent through a packetizer 165 which incorporates one or more of the logical combinations into the payload portion of a packet having a predetermined or other recognized format. The packet may include, for example, a header portion that includes designation information corresponding to a network address of the terminal or terminals to receive the packet. The destination addresses may be used by equipment at node 35 for proper routing to the terminal(s). The packetizer may be a function of the controller or may be provided separately from the controller as shown in FIG. 2.

The formation of a logical combination of segments allows shared link 30 to transfer different data segments to different terminals using the same logical combination. This may result a significant reduction in network traffic while increasing the effective data rate to those terminals. In one embodiment, the logical combination or payload portion of a packet may have the same size as the different segments being combined. Thus, by transferring this logical combination once through the shared network, different data may be transferred to different terminals using the bandwidth of a single segment. Examples of this improved performance are described in greater detail below. In other embodiments, the rate or bandwidth may be different.

The controller may also include or be coupled to a forward error correction (FEC) coder 158. The FEC coder may append error correction bits or modify the bits of the logical combination output from combiner 154 as a safeguard to recording valid data in each of the terminals. The error correction scheme may include one or more parity check bits, Hadamard or Reed Solomon codes, or various types of convolution coding to name a few.

In addition to sending file segments to the terminals, network interface 70 may receive requests for files from the terminals. The requests may be sent to controller 150 for segmenting, selecting and, when required, logically combining those segments for transfer to the requesting terminals.

Figure 3:
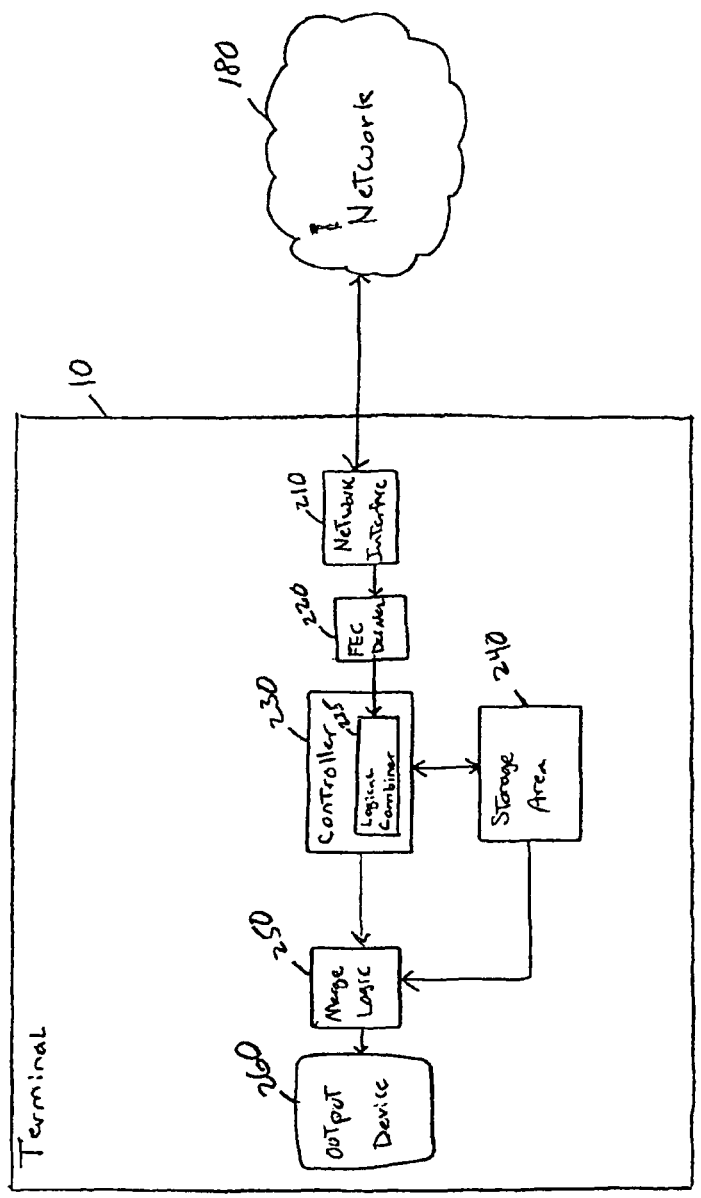
FIG. 3 shows an embodiment of a terminal in FIG. 1.

FIG. 3 shows an embodiment of a terminal for receiving files from the server. The terminal includes a network interface 210, a forward error correction (FEC) decoder 220, a controller 230, a storage area 240, and merge logic 250. In one embodiment, the FEC decoder 220, controller 230, and merge logic 250 may be included in a single processor. In another embodiment, these elements may be included in different processors.

The network interface receives the file segments sent from the server through the network and sends the segments to controller 230. The segments may be received in packets containing logical combinations of segments of the same or different files or segments from a same file not part of a logical combination, depending, for example, on network load conditions, on a phase (e.g., placement or delivery phase) of network operation exists, or based on other conditions.

The controller 230 includes a logical combiner 235 which combines logical combinations of segments with previously segments that have been received by the terminal. These previous segments may be segments of a requested or same file that the terminal previously received or may be segments of a different file not requested by the terminal but which was previously received, or a combination thereof. The logical combiner combines each received logical combination with one or more of these previously received segments to recover one or more next segments of the file requested by the terminal or which was otherwise intended to be sent to the terminal (e.g., in the context of an automatic software update for the terminal).

Recovery of the next segment(s) may be accomplished by logically combining the received logical combination with a one or more previously received segments using the same logical operation. For example, if the sent logical combination was formed by logical combiner 154 using an XOR operation, then logical combiner 235 may use an XOR operation to recover the data. Examples of how this data recovery may take place are explained in greater detail below.

The storage area 240 stores information identifying the segments which have been previously received by the terminal. This information is retrieved from the storage area for use by logical combiner 235 in recovering one or more next segments of the file to be output by the terminal. The storage area 240 may store the segment data itself and/or information identifying that data, as may also be the case with storage area 140 in the server.

The merge logic 250 may combine the recovered data output from the logical combiner 235 and controller to form data blocks suitable for output or programming into the terminal control software. In the case where the segments are bits or bytes, the merge logic may merge the recovered bits or bytes for the file output from logical combiner 235 into data blocks (or, in the case of a software update or application, recovered instructions into code blocks). Those blocks may then be stored or output.

If the data blocks correspond to movie or other multimedia data, the data blocks may be output through output device 260 such as a display, speaker or monitor screen. If the received segments are error coded, an FEC decoder 220 may be included, for example, between network interface 210 and controller 230.

Figure 4:
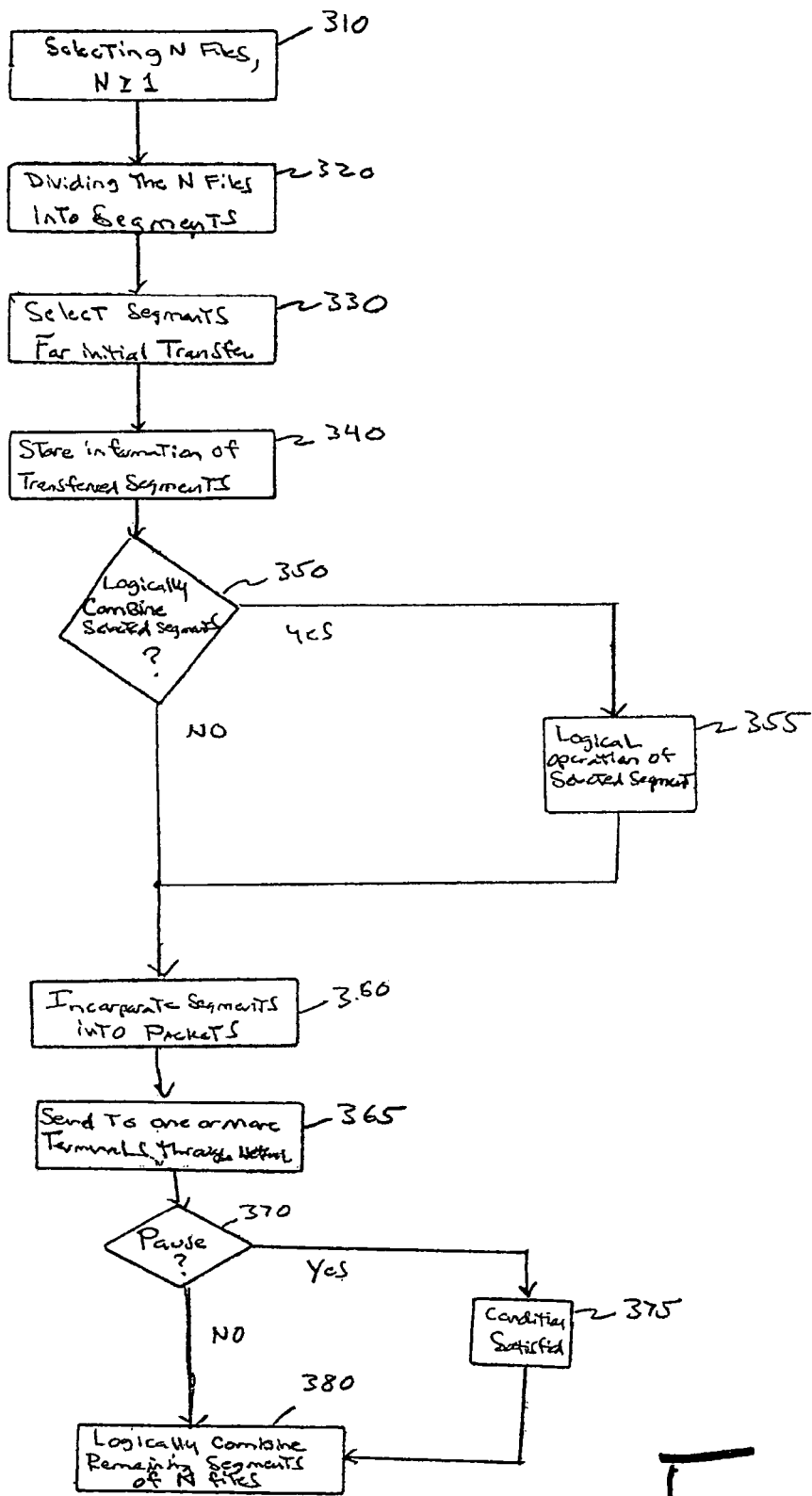
FIG. 4 shows an embodiment of a content distribution method.

FIG. 4 shows operations included in one embodiment of a method for controlling the distribution of information in a network. This embodiment may be performed by the server and terminal shown in FIGS. 2 and 3 or by a different server and/or terminal.

An initial operation includes selecting N files to be sent to one or more network terminals, where N is $\geq 1$. (Block 310). The N files may be selected in the server based on requests for the files from one or more terminals or may be selected based on control software of a network entity such as a server, or based on the statistics of the terminals behavior.

Once the N files are selected, the N files are divided by the server into a plurality of segments. (Block 320). The number of segments and the manner in which segmentation is to be performed may be determined by control software executed, for example, at the server. The N files may be segmented so as to produce a stream of sequential segments or the segmentation may be performed randomly or according to another segmentation algorithm. When N>1, then segmentation of the different files may take place simultaneously using the same or different segmentation algorithm. Also, the entire file may be segmented at this time or only a portion of the file may be segmented.

Once the segments have been created, the segments are selected by the server based on one or more selection techniques. (Block 330). The same selection technique may be used at all times or the selection technique may different at different times, e.g., different phases of network operation or load conditions. For example, during a placement phase where network load is estimated to be relatively light, the segments may be selected in sequential order or random linear combinations. But, during a delivery phase where network load is heavier, a random, interleaved or different selection technique may be implemented.

Information identifying the selected segments (and/or the data segments themselves) are stored in the server to establish a record of segments of the N files that have been to corresponding terminal(s). (Block 340).

A decision is then made by the server as to whether the segments are to be logically combined with other segments, either from the same file or from one or more different files. (Block 350). If the selected segments are to be logically combined, then the selected segments are combined, for example, on a bit-by-bit basis, byte-by-byte basis, or data unit-by-data unit basis using a logical operation. (Block 355). The logically combined segments are then incorporated into packets (Block 360) and sent to corresponding terminal(s) through the network (Block 365), with or without forward error correction coding. If the selected segments are not to be combined, then the selected segments are packetized and sent to the network.

Once a first number of segments of the N files have been sent over the network, a decision is made by the server as to whether to pause sending of additional segments of the N files or to reduce or increase the rate of transmission. (Block 370). This decision, for example, may be based on the prevailing network conditions or estimated network loads within a given interval of time, e.g., over a 24-hour period, on weekly basis, or another period.

In accordance with one example (discussed in greater detail below), a first number of segments of the N files may be sent during a placement phase and remaining ones of the segments of the N files may be sent during a delivery phase. If this is the case, then once the number of the segments of the N files has been sent during the placement phase, transmission of remaining segments of the N files does not take place until a condition is satisfied. (Block 375). For example, the first number of segments may correspond to title or control information (e.g., encoding technique, compression format, etc.) and/or some additional content of the N files or trailers or advertising information.

Once this initial portion of the files has been transferred, then during the delivery phase user requests to view the movie(s) may be received. Remaining segments of the N files may then be transferred. Transfer of the additional segments of the N files may be performed by first logically combining the additional segments with other segments of the same file previously transferred to a terminal or with segments of one or more different files previously transferred to other terminals (Block 380). Different terminals can receive the logical combinations. The combinations are such that terminals can recover the requested files from what they received or saved so far, as described in greater detail below.

Figure 5:
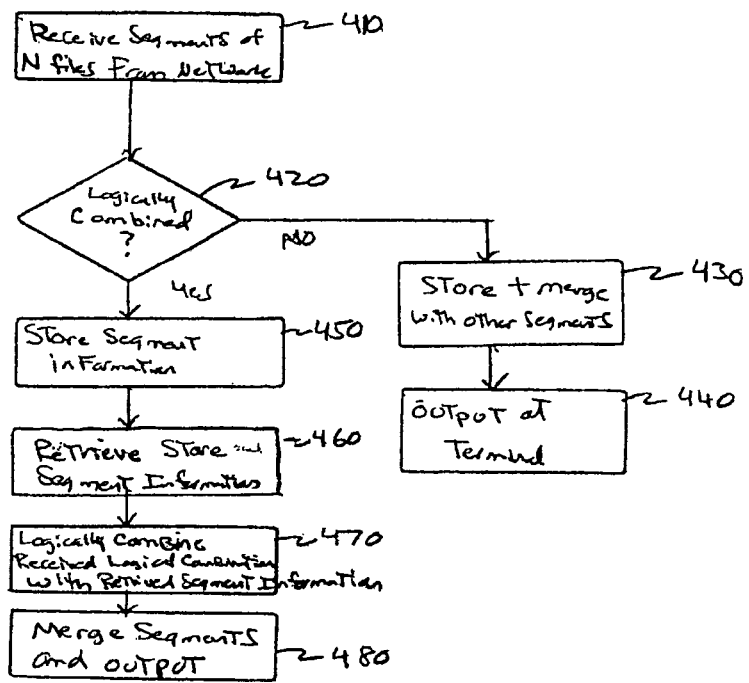
FIG. 5 shows an embodiment to receive content through a network.

FIG. 5 shows operations included in one embodiment of a method for receiving files sent using the method of FIG. 4. This embodiment may be performed in any of the terminals included in FIG. 1.

Once segments of N files have been received from the network (Block 410), a determination may be made as to whether the segments have been logically combined with one or more segments of the same or other ones of the N files. (Block 420). This determination may be made, for example, based on the network phase in which the segments were received (e.g., during placement or delivery phase), based on one or more flag or control bits set in the header of packets containing the segments, based on a time in which a request for a file was transmitted from the terminal to the network, or a combination thereof.

If the received segments have not been logically combined, then the segments are buffered and merged with additional received segments. (Block 430). The merged segments may then be output either immediately or at a later time, e.g., a time when additional segments of a requested file are received. (Block 440).

If the received segments have been logically combined, then information identifying the segments (and/or the segments themselves) are stored (Block 450) and a logical operation is performed to recover the data corresponding to the requested file from the logical combination. For example, the received logical combination may include a previously received segment of the same file that was requested by a different terminal or the logical combination may include a segment from one or more different files previously sent to one or more other terminals.

Irrespective of which is the case, the stored information may then be retrieved (Block 460) and used as a basis for recovering the next segment of the requested file. For example, next segment of the requested file may be recovered by performing the same logical operation on the received logical combination of segments as was performed to create those segments (Block 470). The logical combination involves logically combining the received logical combination of segments with one or more previously received segments for the same file or different files stored in memory.

Once the segments are recovered, they are merged with previously recovered file segments for output on the terminal. (Block 480). Information identifying the recovered segments may be stored in memory. The operations in Blocks 450 to 480 may be performed after a waiting period. For example, segments may be received during a placement phase may not be immediately output on the terminal. Then, additional segments received during a delivery phase may be recovered and merged with previously received data which is then to be output, for example, in response to a terminal request.

Data Recovery Example 1

Example embodiments for recovering segments of a requested file at a terminal will now be discussed. In the first example embodiment, requests have been sent from two terminals 1 and 2 to receive different files from the content distribution network. The different files may be different movies, e.g., the first file A may be the movie Titanic and the second file B may be the movie Gladiator.

During the process of sending these files to the terminals, File A has been divided into a plurality of segments which includes segments A1 and A2, and File B has been divided into a plurality of segments which includes segments B1 and B2. (These segments represent just two data segments of many segments that comprise the files. The segments may be on bit, one byte, one data word, or some other amount of data corresponding to the movies.) In this example, each segment is one bit.

In this example, consider further that Terminal 1 previously received segments A1 and B2 and that information identifying these segments and their respective bit values are stored in Terminal 1. Also, Terminal 2 previously received segments A2 and B1 and that information identifying these segments and their respective bit values are stored in Terminal 2. In order to accurately output the movie Titanic, Terminal 1 needs to receive segment A2 as the segment to be merged with previously received segment A1. (Note that while Terminal 1 has received B2 and has stored information of the same, Terminal 1 does not care about File B because the user of Terminal 1 order Titanic, not Gladiator).

Similarly, in order to accurately output the movie Gladiator, Terminal 2 needs to receive segment B2 as the segment to be merged with previously received segment B 1. (Note that while Terminal 2 has received A2 and has stored information of the same, Terminal 2 does not care about File A because the user of Terminal 2 order Gladiator, not Titanic).

Given these conditions, the server now generates a logical combination in the delivery phase of segments A2 and B2. The logical combination is based an XOR operation and therefore may be expressed as A2⊕B2. When Terminal 1 receives this logical combination, it recovers A2 by performing the following operation: (A2⊕B2)⊕B2=A2. Terminal 1 is able to perform this operation because B2 had been previously received and stored in Terminal 1.

Similarly, when Terminal 2 receives the logical combination, it recovers B2 by performing the following operation: (A2⊕B2)⊕A2=B2. Terminal 2 is able to perform this operation because A2 had been previously received and stored in Terminal 1.

Thus, because the segment corresponding to the logical operation A2⊕B2 is the same bit size as A2 and B2 take alone and because each terminal is able to recover the next data segment it needs for the requested file from this logical combination, then A2 and B2 do not need to be separately transmitted, which takes up considerable network bandwidth and resources.

Figure 6:
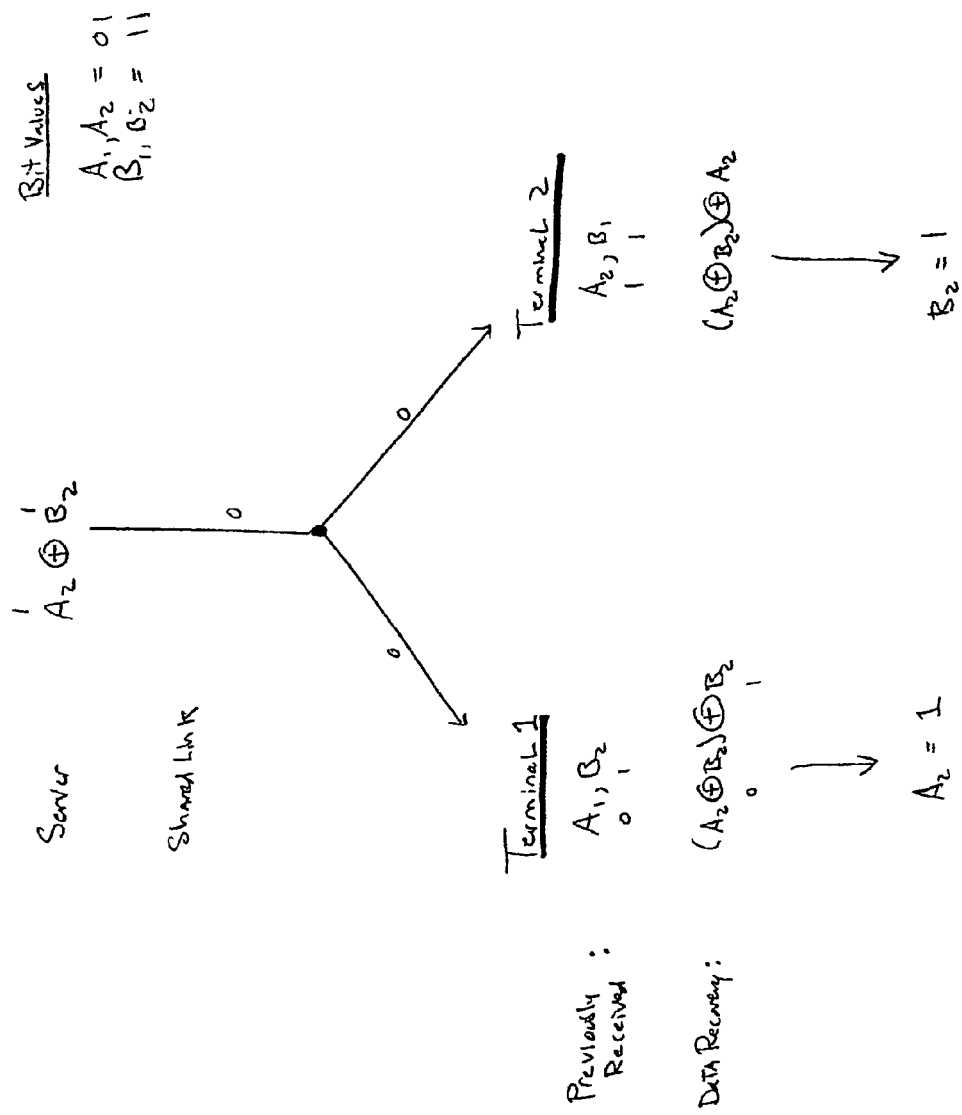
FIG. 6 shows data recovery for file segments having one data bit.

Instead, in accordance with this embodiment, only one segment corresponding to the logical combination may be transmitted to both terminals in one packet (or otherwise simultaneously) at least over shared link 30 to recover different file segments in each respective terminal. Thus, the effective transfer rate is significantly improved over the case where A2 and B2 are separately transmitted to Terminals 1 and 2. FIG. 6 shows this improvement in mathematical terms.

Data Recovery Example 2

Figure 7:
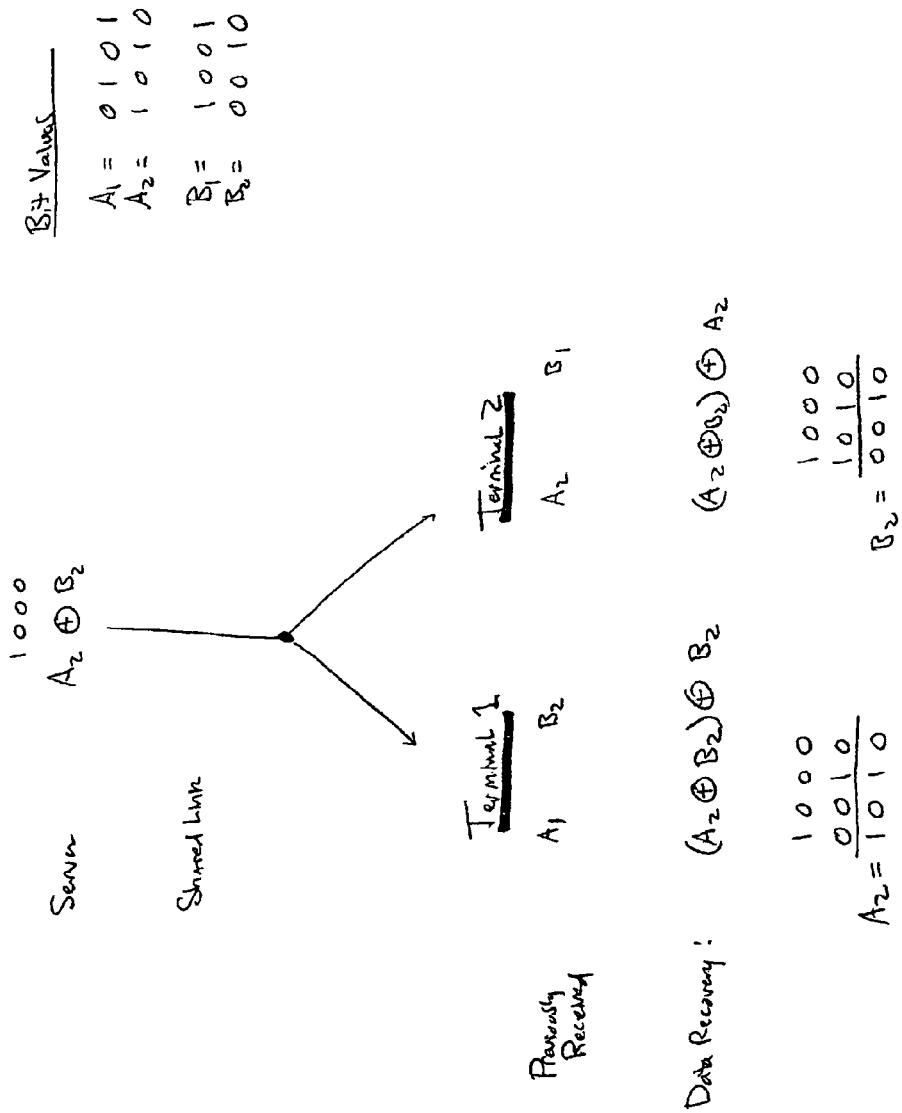
FIG. 7 shows data recovery for file segments having multiple bits.

This example embodiment covers the case where each segment is four bits in length. As shown in FIG. 7, data recovery for segments A2 and B2 is performed in an analogous manner based on the same logical operation.

Data Recovery Example 3

This example embodiment covers the case where each segment is one bit in length and users at Terminals 1 and 2 have requested the same movie, either at different times or the same time. Assume that Terminal 1 has previously received segment A1 and Terminal 2 has previously received segment A2. Then, Terminal 1 needs to recover segment A2 and Terminal 2 needs to recover A1.

To allow for recovery during the delivery phase, the server transmits the logical combination A1⊕A2. Terminal 1 is able to recover A2 by performing the logical combination (A1⊕A2)⊕A1=A2, and Terminal 2 is able to recover A1 by performing the logical combination (A1⊕A2)⊕A2=A1. Additional example embodiments are described below for a different number of terminals and files.

A number of additional embodiments implementing these and other logical combinations under different conditions and applied to placement and delivery phases of operation of a network will now be described.

Additional Embodiments

Another embodiment corresponds to a content-distribution system that includes a server connected through a shared error-free (bottleneck) link to K user terminals. The server stores N files each of size F bits. The user terminals, on the other hand, each have access to a cache able to store MF bits for M□[0, N]

The system operates in at least two phases, namely a placement phase and a delivery phase. The placement phase occurs when the network load is low (e.g., 6 am). During this time, the shared link can be utilized to fill the caches of the user terminals. A main constraint in this phase is the size of the cache memory at each user.

The delivery phase occurs after the placement phase when the network load is high (e.g., 8 pm). At this time, each user may request one file from the server, which proceeds to transmit its response over the shared link. Given the output of the shared link which is observed by both user terminals and their cache content, each user should be able to recover the requested file. A main constraint in this phase is the congestion of the shared link.

In accordance with one or more embodiments described herein, a worst-case (over all possible requests) rate of the shared link may be reduced or minimized in the delivery phase. In another embodiment, the average rate is minimized.

More specifically, in the placement phase, each user terminal is given access to the entire database (e.g., storage area 60) of N files. Each terminal is able to fill its cache as an arbitrary function (linear, nonlinear, . . . ) of the database subject only to its memory constraint of MF bits. The requests from the user terminals may not be known during the placement phase, and hence the caching function may not depend on them.

In the delivery phase, only the server has access to the database. Each of the K users requests one of the N files and communicates this request to the server. Let $d_k \in \{1, 2, \ldots N\}$ be the request of user $k \in \{1, 2, \ldots, K\}$. The server replies to these requests by sending a message over the shared link, which is observed by all the K users. Let $R^{(d_1, \ldots, d_k)}F$ be the number of bits in the message sent by the server. Each user may be able to recover its requested message from the content of its cache and the message received over the shared link with probability arbitrary close to one for large enough file size F.

The worst-case rate (over all possible requests) for a caching scheme may be given by the following equation.

$$R = \max_{d_1, \ldots, d_K} R^{(d_1, \ldots, d_K)}F$$

In accordance with one or more embodiments, this rate R may be reduced or minimized in order to reduce or minimize the worst-case network congestion RF during the delivery phase. In this regard, it is noted that R is a function of the cache size MF. In order to emphasize this dependence, the rate may be written as R(M). Now, denote by $R^\bullet(M)$ the rate of an optimal scheme for arbitrarily large file size F. The function $R^\bullet(M)$ expresses the memory-rate tradeoff and is a fundamental quantity describing the behavior of the content-distribution system.

One way these embodiments may be understood is in view of the following exemplary non-limiting conditions:

Single Shared Link. Consider only one single shared link which models a bottleneck in the system. In a wire-line system, this link might be the one closest to the server, which would see the largest demand. Alternatively, this situation could arise in a wireless setting, where the shared link models the broadcast nature of the physical medium. In this case, the server is to be thought of as being placed at (or close to) the cellular base station or wireless access point.

Broadcast. Communication between the server and terminals may be modeled as taking place over a broadcast channel. In a wireless setting, this channel occurs naturally due to the broadcast nature of the physical channel. In a wire-line setting, the broadcast channel may be interpreted as a logical abstraction and may be implemented, for example, through multicasting over a larger network (e.g., the Internet). The corresponding multicast tree could be either established, for example, directly in the IP layer or, alternatively, in the application layer by setting up dedicated servers along the path from the central server to the user terminals.

Worst-Case Demands. One figure of merit that may be taken into consideration is worst-case requests. For example, in a wireless case, whenever the delivery rate required for a request exceeds the link bandwidth available, the system will be in outage, degrading user experience. In other situations, for example a wire-line case, excess rates might only incur a small additional cost and hence might be acceptable. In this situation, the N files may be the most popular ones. Whenever a user terminal requests a file outside the first N (which should happen with small enough probability), this request could be served through a separate unicast transmission.

Rate over Private Links. The figure of merit may also be expressed as R(M) which is solely concerned with the rate over the shared link. The rate over a private link (e.g., a final path of the link going to the user) may be ignored. This is the appropriate approach in a wireless case because the private links are then absent. However, in a wire-line case the rates over the private links could easily become a bottleneck themselves. In accordance with one or more embodiments, this bottleneck may be reduced or eliminated to improve performance, as discussed in greater detail in Example 3 below.

Synchronized Users. If the delivery phase is modeled as being synchronous, all requests may be assumed to arrive at the server at the same time. In a real system, however, requests will arrive asynchronously. Synchronization may be achieved by having the server wait until the requests from all or a certain number of users are registered before transmitting over the shared link. However, this may lead to intolerable delays, particularly for streaming content such as on-demand movies. One approach for mitigating this situation involves dividing the content (e.g., movie) into smaller segments (say 10 s of video). This approach is elaborated on in Example 6.

Known Number of Users. One approach involves assuming that the number of users K is constant. In particular, K is assumed to be the same in the placement phase as in the delivery phase. Because it is hard to know how many users will be active (e.g., 12 hours) in the future, this may not be realistic However, as will become apparent, one or more embodiments may implement a decentralized caching algorithm where advance knowledge of the number of users in the delivery phase is not required. See Example 4.

One Request per User. In accordance with one implementation, each user terminal may send a request for exactly one file during the delivery phase. However, in a more practical implementation, users might request more than one or, indeed, none of the files in the server database. This situation can be dealt with, for example, by effectively handling each request as a separate user. This will result in a system with a highly variable amount of "virtual" users.

Different File Size. To account for files that have different sizes, each file may be split into smaller segments of constant size, which may or may not be padded with zeros.

Known Cache Content. During the delivery phase, the server is assumed to know the cache content of all K users. This knowledge may be based, for example, on the information stored in storage area 140 in FIG. 2. This knowledge allows the server to send "complementary" (or unsent remaining ones of the segments of a file) to the user terminals. This may be implemented in a variety of ways.

One way involves having the user terminals explicitly inform the server of the content of their caches. If the content is distributed in large enough blocks, then the resulting overhead to the network may be negligible. Another way involves the server and user terminals to agree beforehand on a particular caching strategy, parameterized or coded on a unique ID of each user terminal. Such identification may be based on, for example, an IP or subscriber address of each terminal. Once the server knows this ID, the server can compute or otherwise determine the cache content of each user terminal without further communication.

Cache at Users. In one embodiment, each user terminal may have access to its own private cache. Such a situation can arise, for example, where the user terminal is a set-top or subscriber box that has an integrated or internal hard drive that could be used for caching). In other embodiment, caches may be located close or coupled to, but not directly at, the user terminal. The results and techniques developed here apply to those scenarios as well, as is discussed in Example 5.

Given the foregoing considerations, content may be distributed to multiple user terminals in the placement phase and the delivery phase. In this embodiment, the content distributed to user terminals during the placement phase is decentralized in the sense that the caches of each user are filled independently of other users. This decentralization of the placement phase allows content to be distributed in a more flexible manner than, for example, content distribution in a centralized placement phase. For example, by distributing content in a decentralized placement phase, knowledge of the number of users K in the system during the delivery phase need not be known during the placement phase.

N-File Distribution, N>2

Figure 8:
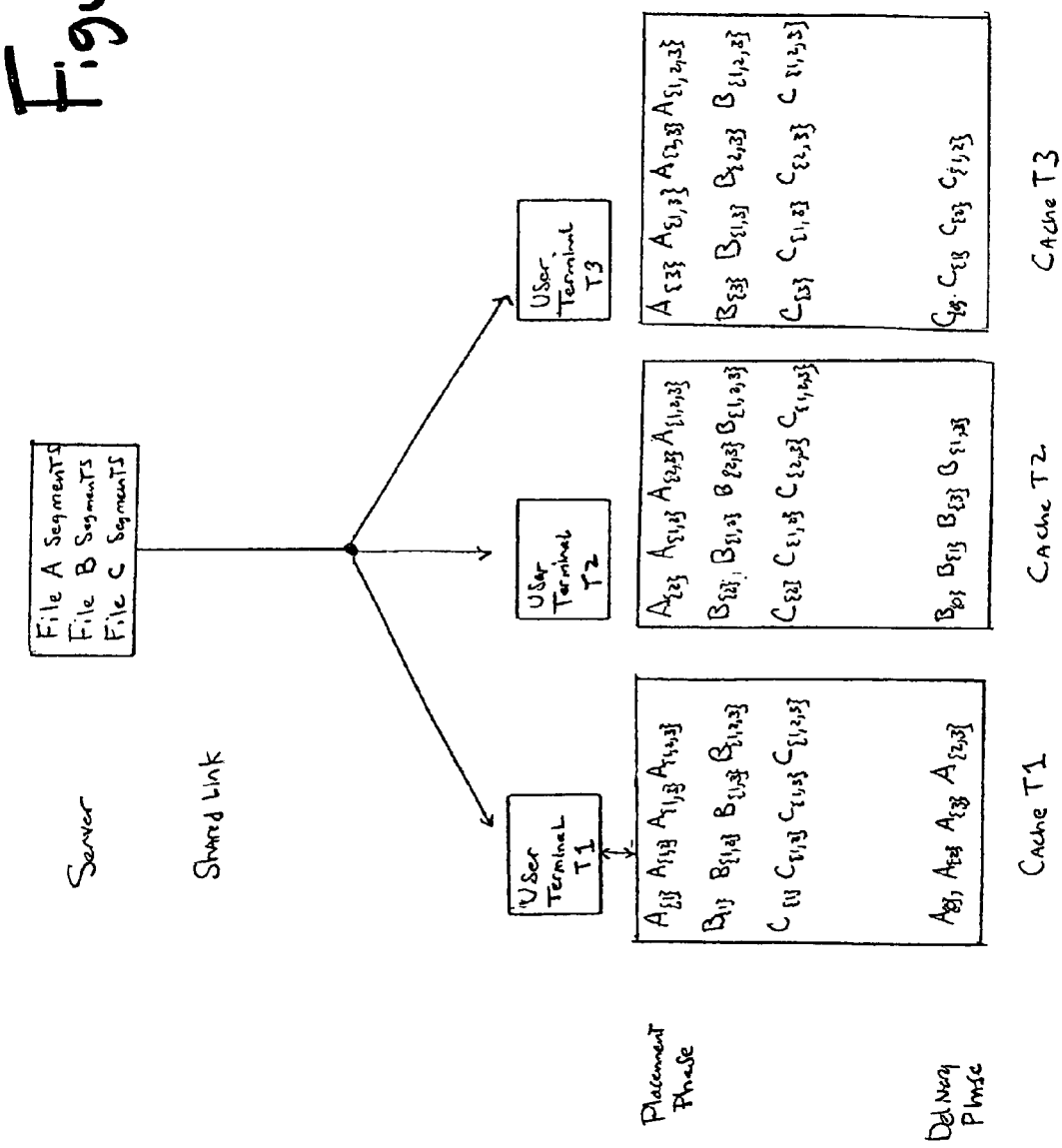
FIG. 8 shows another embodiment of a content distribution method.

FIG. 8 shows another embodiment of a content distribution method. In previous embodiments, the distribution of two files to two user terminals was discussed, e.g., for the case where N=2 and K=2. The embodiment of FIG. 8 provides for the distribution of three files to three user terminals; that is, the content of three files (N=3) A, B, and C is distributed to three user terminals (K=3), where each user terminal has a cache of size M. In the placement phase, user terminals T1, T2, and T3 receive MF/3 bits of each file from the server. The transfer of bits during this phase may be referred to as a prefetching operation, where the bits are selected, for example, randomly and uniformly or according to a preset selection pattern. When received, each bit is stored in the cache of a user terminal with probability M/3.

As an example of this prefetching operation, each file (or portion of a file) may be divided into a number of segments, e.g., 8 sub-files. Some of the segments of each file are then selected and transmitted to (prefetched by) the user terminals. At the conclusion of the prefetching operation, the caches of the user terminals may store the following sub-files:

A=(A0, A{1}, A{2}, A{3}, A{1,2}, A{1,3}, A{2,3}, A{1,2,3})

B=(B0, B{1}, B{2}, B{3}, B{1,2}, B{1,3}, B{2,3}, B{1,2,3})

C=(C0, C{1}, C{2}, C{3}, C{1,2}, C{1,3}, C{2,3}, C{1,2,3})

where $A_S, S \subset \{1,2,3\}$, denotes a subset of bits of file A that have been perfected in cache memories of user terminals 1, 2, and 3, $B_S, S \subset \{1,2,3\}$, denotes a subset of bits of file B that have been perfected in cache memories of user terminals 1, 2, and 3, and $C_S, S \subset \{1,2,3\}$, denotes a subset of bits of file C that have been perfected in cache memories of user terminals 1, 2, and 3.

In other words, at the end of the placement phase, the cache of user terminal T1 stores the following sub-files:

A{1}, A{1,2}, A{1,3}, A{1,2,3}
B{1}, B{1,2}, B{1,3}, 13{1,2,3}
C{1}, C{1,2}, C{1,3}, C{1,2,3}

The cache of user terminal T2 stores the following sub-files:

A{2}, A{1,2}, A{2,3}, A{1,2,3}
B{2}, B{1,2}, B{2,3}, B{1,2,3}
C{2}, C{1,2}, C{2,3}, C{1,2,3}

The cache of user terminal T3 stores the following sub-files:

A{3}, A{1,3}, A{2,3}, A{1,2,3}
B{3}, B{1,3}, B{2,3}, B{1,2,3}
C{3}, C{1,3}, C{2,3}, C{1,2,3}

The sub-files A0, B0, and C0 is a null sub-file which is not stored in any of the user terminal caches. Each sub-file may contain only one bit of information or may contain a plurality of bits. Also, based on the law of large numbers, $|A_S|$ may be expressed as $(M/3)^{|S|}(1-M/3)^{3-|S|}F+o(F)$. Therefore, as probability approaches one for large F, $|A_S|/F$ is about $(M/3)^{|S|}(1-M/3)^{3-|S|}$. The same statements apply to Files B and C.

As an example, during the delivery phase, user terminals T1, T2 and T3 will send requests to the server to receive the remaining sub-files of Files A, B and C, respectively. In response to these requests, the server will generate and send logical combinations of sub-files through the shared link. In accordance with one embodiment, each user terminal may send only one request to the server to receive all of the remaining sub-files of the requested file. Alternatively, additional requests may be sent to receive the remaining sub-files.

For user terminal T1, the sub-files to be received during the delivery phase corresponds to the sub-files that were not received during the placement phase, namely A0, A{2}, A{3}, and A{2,3}. After the server receives a request from user terminal T1 for the remaining files during the delivery phase, the server responds by setting S=3 and sending logical combination $A_{\{2,3\}} \oplus B_{\{1,3\}} \oplus C_{\{1,2\}}$. (The other two terminals may also send requests at this time, or at a different time. In the case where a request is not sent one or both of T2 and T3, T2 and T3 may still recover previously un-received sub-files in the manner described below).

The symbol $\oplus$ corresponds to modulo 2 addition implemented, for example, by an XOR operation. When each sub-file includes only one bit of data, the logical combination $A_{\{2,3\}} \oplus B_{\{1,3\}} \oplus C_{\{1,2\}})$ corresponds to a single bit of data which is incorporated within the payload portion of a packet. (In other embodiments, each sub-file may have multiple bits forming a code word). This packet is then sent simultaneously to user terminals T1, T2 and T3 at least through the shared portion of the link between the server and user terminals.

When the packet is received, it is decoded by user terminal T1 to recover one of the remaining sub-files of File A. This is accomplished in each user terminal by logically combining the received logical combination $A_{\{2,3\}} \oplus B_{\{1,3\}} \oplus C_{\{1,2\}}$ with matching sub-files received during the placement phase.

As denoted by the subscript "1," user terminal T1 previously received $B_{\{1,3\}}$ and $C_{\{1,2\}}$ during the placement phase for storage in its cache. To recover remaining sub-file $A_{\{2,3\}}$, T1 logically combines $A_{\{2,3\}} \oplus B_{\{1,3\}} \oplus C_{\{1,2\}}$ with stored $B_{\{1,3\}}$ and $C_{\{1,2\}})$ to recover $A_{\{2,3\}}$ which was not received during the placement phase. Mathematically, this may be stated as follows: $(A_{\{2,3\}} \oplus B_{\{1,3\}} \oplus C_{\{1,2\}})) \oplus B_{\{1,3\}} \oplus C_{\{1,2\}} = A_{\{2,3\}}$. The recovered sub-file $A_{\{2,3\}}$ is stored to be merged with sub-file(s) received during the placement phase and/or the sub-file(s) yet to be received from File A for output.

When user terminal T2 receives $A_{\{2,3\}} \oplus B_{\{1,3\}} \oplus C_{\{1,2\}}$, T2 logically combines $A_{\{2,3\}} \oplus B_{\{1,3\}} \oplus C_{\{1,2\}}$ with $A_{\{2,3\}}$ and $C_{\{1,2\}}$ which were received and stored during the placement phase to recover sub-file $B_{\{1,3\}}$. The recovered sub-file $B_{\{1,3\}}$ is stored in the cache of T2 to be merged with sub-file(s) received during the placement phase and/or the sub-file(s) yet to be received from File B for output.

When user terminal T3 receives $A_{\{2,3\}} \oplus B_{\{1,3\}} \oplus C_{\{1,2\}}$, T3 logically combines $A_{\{2,3\}} \oplus B_{\{1,3\}} \oplus C_{\{1,2\}}$ with $A_{\{2,3\}}$ and $B_{\{1,3\}}$ which were received and stored during the placement phase to recover sub-file $C_{\{1,2\}}$. The recovered sub-file $C_{\{1,2\}})$ is stored in the cache of T3 to be merged with sub-file(s) received during the placement phase and/or the sub-file(s) yet to be received from File C for output.

After the logical combination $A_{\{2,3\}} \oplus B_{\{1,3\}} \oplus C_{\{1,2\}}$ is sent, the server sets S=2 and sends a logical combinations of remaining sub-files that have not yet been received by the user terminals. In accordance with one embodiment, multiple logical combinations may be generated at this time. For example, when S=2, the server may generate the following logical combinations: $A_{\{2\}} \oplus B_{\{1\}}$, $A_{\{3\}} \oplus C_{\{1\}}$, and $C_{\{2\}} \oplus B_{\{3\}}$).

The bits (or sets of bits in the case where each sub-file is greater than one bit) corresponding to these logical combinations may be incorporated into one packet to be sent to the user terminals or the bits may incorporated into different packets. In one implementation, a packet containing $A_{\{2\}} \oplus B_{\{1\}}$ may be sent to user terminals T1 and T2 but not T3 because this combination does not contain any sub-file of File C. Alternatively, T3 may receive and store $A_{\{2\}}$ and $B_{\{1\}}$. The same may apply with respect to other logical combinations to be sent.

When $A_{\{2\}} \oplus B_{\{1\}}$ is received by T1 and T2, the following logical combinations are performed: $(A_{\{2\}} \oplus B_{\{1\}}) \oplus B_{\{1\}}$ is performed by T1 to recover sub-file $A_{\{2\}}$ and $(A_{\{2\}} \oplus B_{\{1\}}) \oplus A_{\{2\}}$ is performed by T2 to recover sub-file $B_{\{1\}}$.

When $A_{\{3\}} \oplus C_{\{1\}}$ is received by T1 and T3, the following logical combinations are performed: $(A_{\{3\}} \oplus C_{\{1\}}) \oplus C_{\{1\}}$ is performed by T1 to recover sub-file $A_{\{3\}}$ and $(A\{3\} \oplus C_{\{1\}}) \oplus A_{\{3\}}$ is performed by T3 to recover sub-file $C_{\{1\}}$.

When $C_{\{2\}} \oplus B_{\{3\}}$ is received by T2 and T3, the following logical combinations are performed: $(C_{\{2\}} \oplus B_{\{3\}}) \oplus C_{\{2\}}$ is performed by T2 to recover sub-file $B_{\{3\}}$ and $(C_{\{2\}} \oplus B_{\{3\}}) \oplus B_{\{3\}}$ is performed by T3 to recover sub-file $C_{\{2\}}$.

To send the remaining sub-files of Files A, B and C, the server sets S=1 and sends sub-files $A_\emptyset$, $B_\emptyset$, and $C_\emptyset$. These files may be sent to user terminals T1, T2, and T3 in individual packets or may be sent in a single packet. For at least one or more embodiments described herein, a single packet may sent to multiple user terminals, for example, by including multiple destination addresses in a header of the packet.

Once user terminals T1, T2, and T3 receive $A_\emptyset$, $B_\emptyset$, and $C_\emptyset$, all the sub-files of Files A, B and C will have been received. These sub-files may be merged and output with other sub-files to provide a complete and continuous presentation of the content on an output device of the terminals or, for example, to provide a complete software update when the files correspond to control software for the terminals. An example of pseudocode that may be used to implement this method is provided below.

---

Algorithm 1

```
1:  procedure PLACEMENT
2:      for k ∈ [K], n ∈ [N] do
3:          User k caches a random subset of MF/N bits of file n
4:      end for
5:  end procedure
6:  procedure DELIVERY(d₁,...,d_K)
7:      if N ≤ N/M (1 − (1 − M/N)^K) then
8:          Server sends F(1 − M/N) random linear combinations of
            bits of each file.
9:      else
10:         for s = K,K − 1,...,1 do
11:             for S ⊂ [K] : |S| = s do
12:                 Server sends ⊕_{k∈S} V_{k,S\{k}}
13:             end for
14:         end for
15:     end if
16: end procedure
```

---

In this pseudocode, $V_{k,S}$ denotes bits of file $d_k$ requested by user k cached exclusively at users in S. In other words, a bit of file $d_k$ is in $V_{k,S}$ if it is present in the cache of every user in S and if it is absent from the cache of every user outside S. Also, the $\oplus$ operation may be performed bit-by-bit, and $V_{k,S\setminus\{k\}}$ may be zero padded to the length of the longest element.

By sending logical combinations of sub-files to user terminals that contain one previously un-received sub-file and one or more previously received sub-files, a single packet may be sent to multiple user terminals which can be decoded to derive different sub-files for those terminals. Thus, the effective transfer rate and bandwidth of content may be increased in the shared link between the server and terminals, which thereby may reduce the bottleneck (congestion) of data transfers through this link.

One variation contemplates dividing the files into a plurality of portions, where each portion contains eight (or a different number) of sub-files. In this case, once the eight sub-files have been received for any portion, the server may begin sending the remaining portions of the files on a sub-file-by-sub-file basis in a manner analogous to the method described above.

Private Link Distribution

The network paths 401 to 40N may be considered in some instances to be private links, in the sense that they branch off from shared link 30. One or more embodiments may not increase congestion or traffic in the private lines, even though they may increase the effective transfer rate and bandwidth through the shared link.

In each private link, a corresponding user terminal may receive an M/N fraction of each file in the placement phase and may receive the remaining part from the server during the delivery phase. Thus the normalized rate may be 1−M/N. For example, in the previous embodiment where N>2 files are sent to N>2 user terminals, each user terminal may not receive all messages (e.g., packets) sent by server to recover its requested file. For example, to recover a sub-file from File A during the delivery phase, user terminal T1 only needs $A_{\{2,3\}} \oplus B_{\{1,3\}} \oplus C_{\{1,2\}}$), $A_{\{2\}} \oplus B_{\{1\}}$, $A_{\{3\}} \oplus C_{\{1\}}$, and $A_\cap$, which have the aggregated size of $(1−M/N)F+o(F)$. Thus, no net increase in traffic congestion in the private links to each terminal may be realized.

Unknown Number of Users

In the placement phase, the number users which share a bottleneck (e.g., shared link 30) in the delivery phase is unknown. This may have implications in wire-line and wireless networks. For example, in a wire-line network or path, some of the users may be off-line and may not request any file in peak-traffic time. In a wireless network or path, users move from network to network and/or cell to cell. As a result, the number of users which have access to the server through shared link 30 may not be known in the delivery phase.

Any concern about the unknown number of users in the delivery phase may be alleviated by the prefetching operation performed in the placement phase. In the placement phase, file transfers are performed independently of the set and number of active user terminals sharing link 30. For example, each user terminal may randomly select an M/N portion of each file in a manner completely independent of other user terminals. Therefore, no matter what the number of users is in the delivery phase, the rate is within a constant factor of an optimal or desired rate.

Shared Caches

In one implementation, two or more user terminals may share a same cache. In such a case, a corresponding method may include evaluating the gain of the shared cache as a way of reducing or obtaining a desired transfer rate through the shared link.

For example, K user terminals may be divided into subsets and the user terminals in at least one of the subsets may share a cache. The subset may have g user terminals where g is a positive integer, K is divisible by g, and the user terminals in the subset are $\{(r−1)g+1, (r−1)g+2, \ldots, (r−1)g+g\}$ for $r=1, 2, \ldots, K/g$. The number of files may be greater that the number of users in this case (e.g., N≥K) or vice versa. Also, where multiple subsets with user terminals sharing a cache, each subset may have the same or a different number of user terminals.

If there is no coordination in the prefetching phase, the following rate may be achieved during the delivery phase.

$$R_{1,g}(M) = g(gN/M − 1)(1 − (1 − gM/N)^{K/g})$$

Given these conditions, a super-user terminal r, $r=1, 2, \ldots, K/g$ may be defined as a collection of user terminals $\{(r−1)g+1, (r−1)g+2, \ldots, (r−1)g+g\}$ with an aggregated cache of size gM. During a prefetching operation in the placement phase, N files and K/g super-user terminals may exist, where each super-user terminal has a cache memory of a size Mg.

To achieve rate $R_{1,g}(M)$ indicated above, in the delivery phase, user terminal K may send a request to the server for a file $W_{d_K}$. In this regard, super-files may be given by $\hat{W}_r^{(d_1, \ldots, d_K)} = (W_{d_{(r-1)g+1}} \ldots W_{d_{(r-1)g+g}})$, where $r=1, \ldots, K/g$. Thus, a super-user terminal r may send a request for super-file $\hat{W}_r^{(d_1, \ldots, d_K)}$, where $r=1, \ldots, K/g$. Then, the N-File Distribution, N≥2, embodiment previously discussed may be applied for these super files.

Asynchronized User Terminals

In some embodiments, one or more of the user terminals may request files at the same time and the server may start to download the requested files at the same time. However, in other situations, this synchronous relationship may not exist. For example, the user terminal requests may be sent at different times. In this case, the files may be sent in accordance with any one of the aforementioned embodiments concatenated with a file segmentation operation that takes into consideration different request times.

Consider again the case of three files N=3, denoted by $W_1$, $W_2$, and $W_3$, to be sent to three user terminals, K=3, where each user is equipped with a cache of size M. Each file may be divided into η segments as $W_j = (W_j^{(1)}, \ldots, W_j^{(\eta)})$, where η is a positive integer and is selected depending on a maximum tolerated delay (discussed in greater detail below). In this illustrative case, allow η=4.

In the placement phase, each file segment may be treated as a separate file. Therefore, in the example under consideration, there are ηN files, $W_j^{(\xi)}$, $j=1, \ldots, N$, $\xi=1, \ldots, \eta$, and file transfer during the placement phase is performed using the N-File Distribution previously discussed where N>2.

Figure 9:
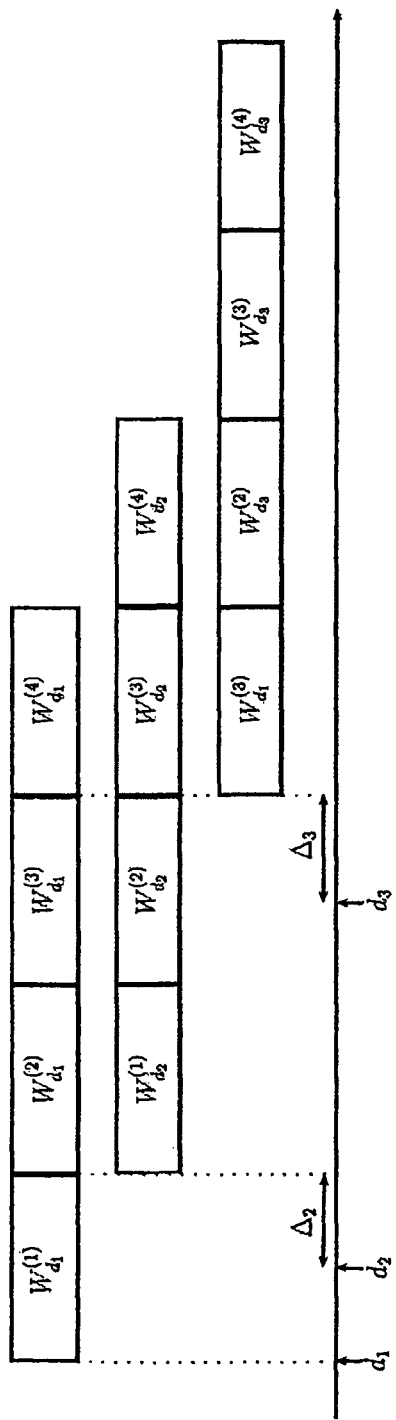
FIG. 9 shows a timing diagram for requests received by the server from different user terminals at different times during the delivery phase.

FIG. 9 shows a timing diagram for requests received by the server from different user terminals at different times during the delivery phase. In the delivery phase, when a request for file $d_1$ is received for a first user terminal, the server starts to deliver the first segment of file $W_{d_1}$, denoted $W_{d_1}^{(1)}$.

During transfer of file segment $W_{d_1}^{(1)}$, a request for file $W_{d_1}$ is received from a second user terminal. The server delays responding to this request (for a delay time $\Delta_2$) and finishes sending file segment $W_{d_1}^{(1)}$. Then the server starts to deliver the next segment of $W_{d_1}$ and the first segment of $W_{d_2}$, i.e. $W_{d_1}^{(2)}$ and $W_{d_2}^{(1)}$ together, either in the same or different packets. The server may deliver $W_{d_1}^{(2)}$ and $W_{d_2}^{(1)}$ based on the distribution embodiments disclosed herein.

After these segments are transferred, the server starts delivering $W_{d_1}^{(3)}$ and $W_{d_2}^{(2)}$ to the first and second users simultaneously. During sending of file segment $W_{d_2}^{(2)}$, a request for file $W_{d_3}$ may be received from a third user terminal. The server delays responding to this request (for a delay time A3) and finishes sending $W_{d_1}^{(3)}$ and $W_{d_2}^{(2)}$. The server responds to the request after finishing delivery of $W_{d_1}^{(3)}$ and $W_{d_2}^{(2)}$, and then starts to deliver $W_{d_1}^{(4)}$, $W_{d_2}^{(3)}$, and $W_{d_3}^{(1)}$ to the first, second, and third users using the N-File Distribution embodiment where N>2. The delay times $\Delta_2$ and $\Delta_3$ may depend on the size of the file segments. The sizes of the segments may therefore be set, or equivalently η, may be set so as not to violate a predetermined or desired maximum delay.

Caching Linear Combinations of the Files

In another embodiment, each user terminal may save one or more linear combinations of each received file or file segment. In this case, each file $W_n$ may be divided into L equal size packets $w_{n,1}, \ldots, w_{n,L}$, where each packet is encoded as an element of the finite field GF(q). The file $W_n$ may therefore be represented by the vector $w_n = [w_{n,1}, \ldots, w_{n,L}]^T \in (GF(q))^L$, for $n = 1, \ldots, N$. (The files may have the same or different sizes).

In the placement phase, file segments may be transferred based on a linear mapping from $w_n = [w_{n,1}, \ldots, w_{n,L}]^T$ to $Z_{k,n}$ cache of user k dedicated for file $W_n$. This linear mapping may be represented by a matrix $V_{k,n}$ with entries in GF(q). We store $V_{k,n}^T w_n$ in the cache partition $Z_{n,k}$ of user k dedicated to file $W_n$.

The linear caching, represented by $V_{n,k}$, can be chosen using different approaches and criteria. Two possible approaches are outlined as follows:

The elements of $V_{n,k}$ are randomly chosen from GF(q). This can be done while further ensuring that $V_{n,k}$ satisfies certain properties such as being diagonal or sparse.

First, encode the vector $w_n$ into another vector $\hat{w}_n \in GF(q)^{\hat{L}}$ using a linear error-correcting code with rate $L/\hat{L}$. The cache $Z_{n,k}$ is then populated by randomly choosing elements from $\hat{w}_n$.

In the delivery phase, each user $k \in [K]$ requests one file $d_k \in [N]$. The procedure embodied in the following psuedocode may be used to construct the signal to be sent from the server to the user terminals over the shared link as a response to these requests.

In accordance with another embodiment, a method for distributing information in a network includes sending a first segment of a first file to a first terminal, sending a second segment of the first file to a second user, generating a first logical combination of the first and second segments of the first file, and transmitting the first logical combination to the first terminal and the second terminal through a same network link.

A logical combination of the first logical combination and the first segment of the first file corresponds to the second segment of the first file and a logical combination of the first logical combination and the second segment of the first file corresponds to the first segment of the first file. Thus, in this embodiment, the first and second user terminals may receive, for example, the same movie but different segments of that movie may be selected and sent to the first and second terminals during the prefetching operation. The first and second terminals may store different segments of the same movie before receiving the logical combinations of the movie segments.

In accordance with another embodiment, a computer-readable medium stores software, firmware, middleware or other instructions for causing a controller to perform all or any portion of the method embodiments discussed herein. For example, the computer-readable medium may include code to perform all or a portion of the operations of the methods disclosed herein including but not limited to the segmenting, selection and logical combining operations. The medium may be a random access memory, flash memory, network-attached storage, read only memory, or another type of storage area included within or coupled to the controller.

Algorithm 2

```
 1: procedure DELIVERY
 2:     for n ∈ [N] do
 3:         for k ∈ [K] do
 4:             V̂_{k,n} ← V_{k,n}              ▷ Server tracks content available at users
 5:         end for
 6:     end for
 7:     for t = K, K − 1,...,1 do
 8:         𝔊 ← {S ⊂ [K] : |S| = t}
 9:         for S ∈ 𝔊 do
10:             if d_k = d_j ∀k,j ∈ S then      ▷ All users in S request the same file
11:                 λ ← min_{k∈S} dim(V̂1/k,d_k)
12:                 U is randomly chosen from GF(q)^{L×λ}
13:                 Server sends U^T w_{d_k}
14:                 V̂_{k,d_k} ← [V̂_{k,d_k}, U]
15:             else
16:                 for k ∈ S do
17:                     U_{d_k,S\{k}} ← basis {∩_{i∈S\{k}} Ω(V̂_{i,d_k}) ∩ Ω(V̂1/k,d_k)} ▷ Find what all users in S \ k
    simultaneously have for user k. Ω(V) denotes the subspace spanned by V.
18:                 end for
19:                 μ = min_{k∈S} dim(U_{d_k,S\{k}})
20:                 for all k ∈ S do
21:                     U_{d_k,S\{k}} ← the first μ columns of U_{d_k,S\{k}}   ▷ Ensure that U_{d_k,S\{k}} has the
    same size for all k ∈ S
22:                 end for
23:                 Server send ⊕_{k∈S} U_{d_k,S\{k}}^T w_{d_k}    ▷ This messages is useful for all users in S
24:                 for k ∈ S do
25:                     V̂_{k,d_k} ← [V̂_{k,d_k}, U_{d_k,S\{k}}]    ▷ Server tracks content available at users
26:                 end for
27:             end if
28:         end for
29:     end for
30:     for k ∈ [K] do    ▷ Ensure each user has sufficient number of equations to recover requested file
31:         λ ← dim(V̂1/k,d_k)
32:         U is randomly chosen from GF(q)^{L×λ}
33:         Server sends U^T w_{d_k}
34:     end for
35: end procedure
```

We claim:

1. A method for distributing information in a network, comprising:
    independently selecting segments of N files with N≥2;
    sending the selected segments to K terminals with K≥2, the sending including sending one or more of the selected segments except a first segment to a first number of the K terminals and sending one or more of the selected segments except a second segment to a second number of the K terminals;
    generating a first logical combination of segments of L files of the N files, the logical combination being based on an XOR operation for remaining portions of the N files to be sent to the K≥2 terminals, with L≤N; and
    sending the first logical combination to Q terminals of the K terminals, with Q≤K, the one or more selected segments sent to the first number of K terminals including the second segment and the one or more selected segments sent to the second number of K terminals including the first segment, a logical combination of the first logical combination and the one or more selected segments sent to the first terminal corresponding to the first segment and a logical combination of the first logical combination and the one or more selected segments sent to the second terminal corresponding to the second segment.

2. The method of claim 1, wherein the first and second segments correspond to different files of the N files.

3. The method of claim 1, wherein the first and second segments correspond to a same file of the N files.

4. The method of claim 1, wherein the first number of the K terminals is one or more.

5. The method of claim 1, wherein the second number of the K terminals is one or more.

6. The method of claim 1, wherein the first number of the K terminals equals the second number of the K terminals.

7. The method of claim 1, further comprising:
    combining a first number of bits from a first one of the N files with a second number of bits from a second one of the N files; and
    forming one of the first segment or the second segment based on a combination of the first and second numbers of bits.

8. The method of claim 7, wherein the first number of bits is different from the second number of bits.

9. The method of claim 1, further comprising:
    generating the first and second segments in different servers.

10. The method of claim 1, wherein the N files are sub-files of same content.

11. A system for distributing information, comprising:
    a processor configured to,
        independently select segments of N files;
        send the selected segments to K terminals, where, N≥2 and K≥2, the controller configured to send one or more of the selected segments except a first segment to a first number of the K terminals and to send one or more of the selected segments except a second segment to a second number of the K terminals,
        generate a first logical combination of segments of L files of the N files, the logical combination being based on an XOR operation for remaining portions of the N files to be sent to the K≥2 terminals, with L≤N; and
        send the first logical combination to Q terminals of the K terminals, with Q≤K, the one or more selected segments sent to the first number of K terminals including the second segment and the one or more selected segments sent to the second number of K terminals including the first segment, a logical combination of the first logical combination and the one or more selected segments sent to the first terminal corresponding to the first segment and a logical combination of the first logical combination and the one or more selected segments sent to the second terminal corresponding to the second segment.

12. The processor of claim 11, wherein the first and second segments correspond to different files of the N files.

13. The processor of claim 11, wherein the first and second segments correspond to a same file of the N files.

14. The processor of claim 11, wherein the first number of the K terminals is one or more.

15. The processor of claim 11, wherein the second number of the K terminals is one or more.

16. The processor of claim 11, wherein the first number of the K terminals equals the second number of the K terminals.

17. The processor of claim 11, wherein the controller is configured to:
    combine a first number of bits from a first one of the N files with a second number of bits from a second one of the N files; and
    form one of the first segment or the second segment based on a combination of the first and second numbers of bits.

18. The processor of claim 17, wherein the first number of bits is different from the second number of bits.

19. The processor of claim 11, wherein the N files are sub-files of same content.

20. The processor of claim 11, wherein the N files are different movies.

* * * * *